US012615240B1

(12) United States Patent
Dawani et al.

(10) Patent No.: US 12,615,240 B1
(45) Date of Patent: Apr. 28, 2026

(54) IDENTIFYING UNENCRYPTED NETWORK FLOWS USING VIRTUAL PRIVATE CLOUD ENCRYPTION CONTROLS

(71) Applicant: Amazon Technologies, Inc., Seattle, WA (US)

(72) Inventors: Anoop Dawani, Redmond, WA (US); Abhinethra Maras, Danville, CA (US); Kevin P. Smith, Fairfax, VA (US); Matthew Browne Barr, Arlington, VA (US); Shuai Ye, Herndon, VA (US); Ajay Amuthan, Herndon, VA (US); Andrew Tandoc, Seattle, WA (US); Deepak Ranjan, Vienna, VA (US); Jeffrey Michael Bozek, Herndon, VA (US); Gary Keith Wicker, Bainbridge Island, WA (US); Konrad Tadeusz Siebor, Sterling, VA (US); Parthesh Patel, Arlington, VA (US); Sabya Sachi, Ashburn, VA (US); Shigang Zhu, Herndon, VA (US); Ethan Joseph Torretta, Edmonds, WA (US)

(73) Assignee: Amazon Technologies, Inc., Seattle, WA (US)

( * ) Notice: Subject to any disclaimer, the term of this patent is extended or adjusted under 35 U.S.C. 154(b) by 41 days.

(21) Appl. No.: 18/900,383

(22) Filed: Sep. 27, 2024

(51) Int. Cl.
*H04L 9/40* (2022.01)

(52) U.S. Cl.
CPC ...... *H04L 63/0428* (2013.01); *H04L 63/0272* (2013.01)

(58) Field of Classification Search
None
See application file for complete search history.

(56) References Cited

U.S. PATENT DOCUMENTS

| | | | | |
|---|---|---|---|---|
| 11,805,062 | B1 * | 10/2023 | Smith | H04L 63/0428 |
| 2013/0133032 | A1 * | 5/2013 | Li | H04L 63/062 726/3 |
| 2020/0404082 | A1 * | 12/2020 | Shcherbakov | H04L 67/10 |
| 2023/0336575 | A1 * | 10/2023 | Ackerman | H04L 63/1425 |
| 2025/0330496 | A1 * | 10/2025 | Selvaraj | H04L 41/02 |

* cited by examiner

*Primary Examiner* — James R Turchen
(74) *Attorney, Agent, or Firm* — Nicholson DeVos Webster & Elliott LLP

(57) ABSTRACT

Techniques for identifying unencrypted network flows using virtual private cloud encryption controls are described. An encryption control system in a cloud provider network receives a request to monitor an encryption state of network traffic associated with a virtual private cloud (VPC). Based on collected network flow data indicative of an encryption state associated with each network flow, the system identifies a network flow associated with the VPC as not being encrypted. This identified network flow, which may be present in the VPC or in underlying architecture of the cloud provider network, can be presented via a user interface.

20 Claims, 10 Drawing Sheets

Figure 2:
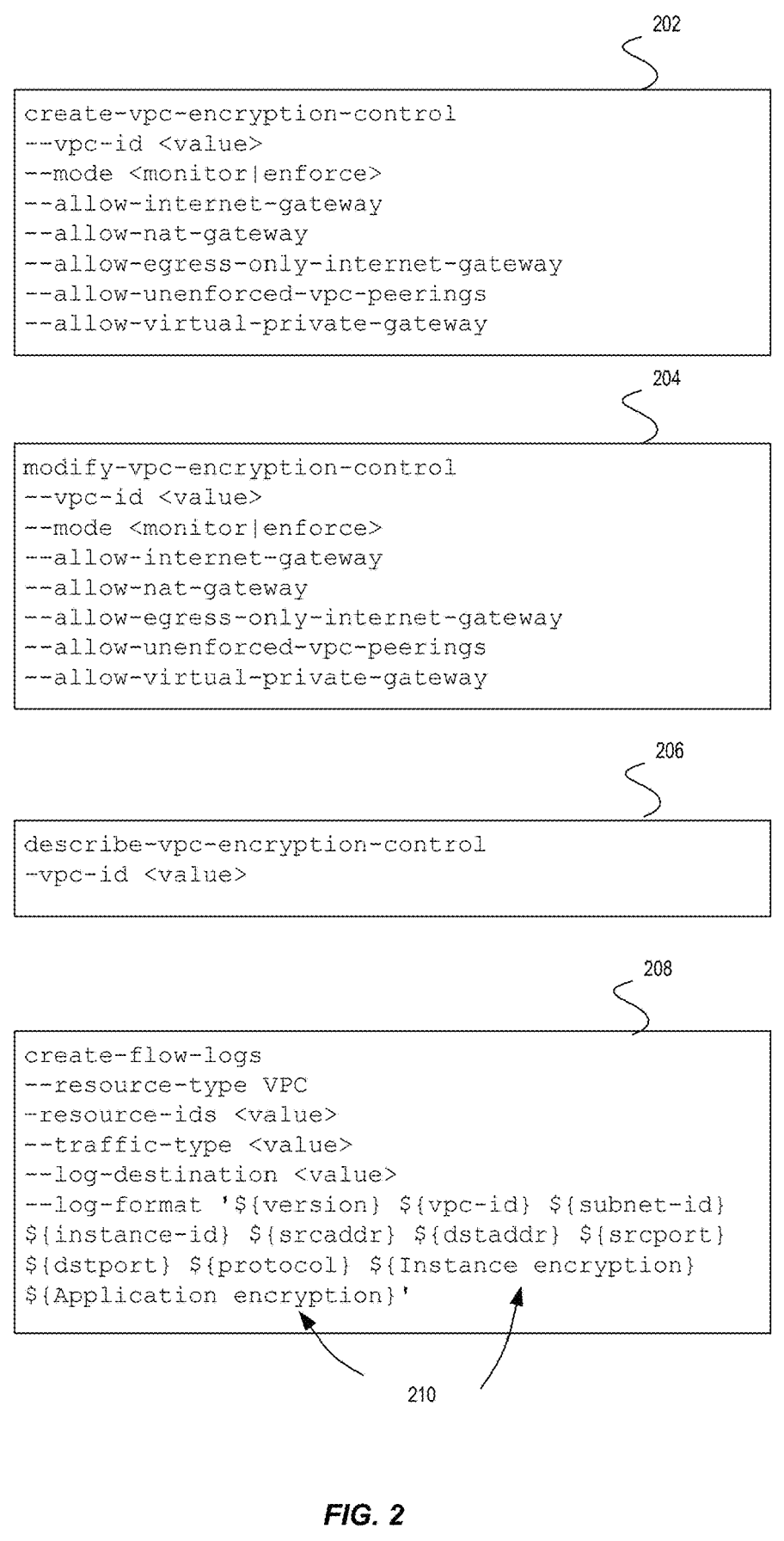

202

```
create-vpc-encryption-control
--vpc-id <value>
--mode <monitor|enforce>
--allow-internet-gateway
--allow-nat-gateway
--allow-egress-only-internet-gateway
--allow-unenforced-vpc-peerings
--allow-virtual-private-gateway
```

204

```
modify-vpc-encryption-control
--vpc-id <value>
--mode <monitor|enforce>
--allow-internet-gateway
--allow-nat-gateway
--allow-egress-only-internet-gateway
--allow-unenforced-vpc-peerings
--allow-virtual-private-gateway
```

206

```
describe-vpc-encryption-control
-vpc-id <value>
```

208

```
create-flow-logs
--resource-type VPC
-resource-ids <value>
--traffic-type <value>
--log-destination <value>
--log-format '${version} ${vpc-id} ${subnet-id}
${instance-id} ${srcaddr} ${dstaddr} ${srcport}
${dstport} ${protocol} ${Instance encryption}
${Application encryption}'
```

OPERATIONS
600

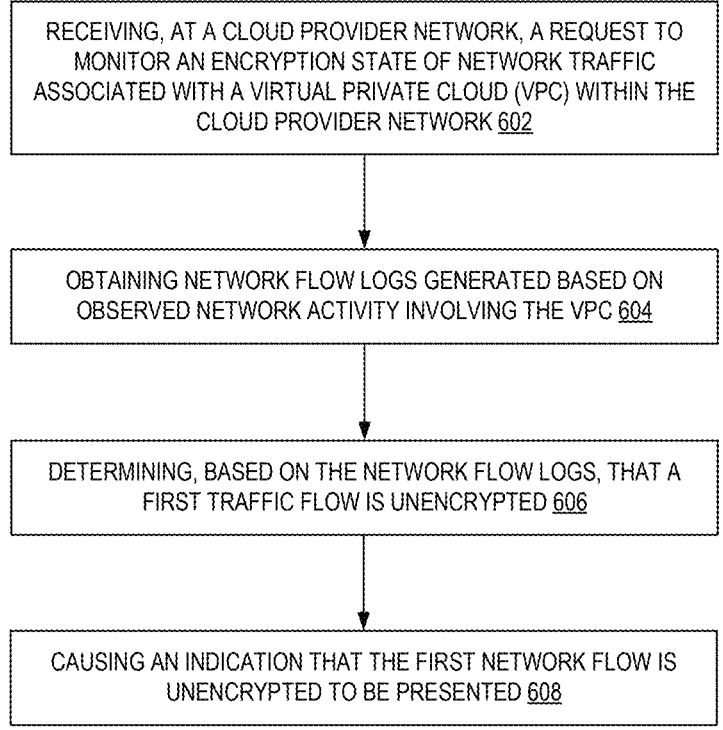

RECEIVING, AT A CLOUD PROVIDER NETWORK, A REQUEST TO MONITOR AN ENCRYPTION STATE OF NETWORK TRAFFIC ASSOCIATED WITH A VIRTUAL PRIVATE CLOUD (VPC) WITHIN THE CLOUD PROVIDER NETWORK 602

OBTAINING NETWORK FLOW LOGS GENERATED BASED ON OBSERVED NETWORK ACTIVITY INVOLVING THE VPC 604

DETERMINING, BASED ON THE NETWORK FLOW LOGS, THAT A FIRST TRAFFIC FLOW IS UNENCRYPTED 606

CAUSING AN INDICATION THAT THE FIRST NETWORK FLOW IS UNENCRYPTED TO BE PRESENTED 608

*FIG. 6*

OPERATIONS
700

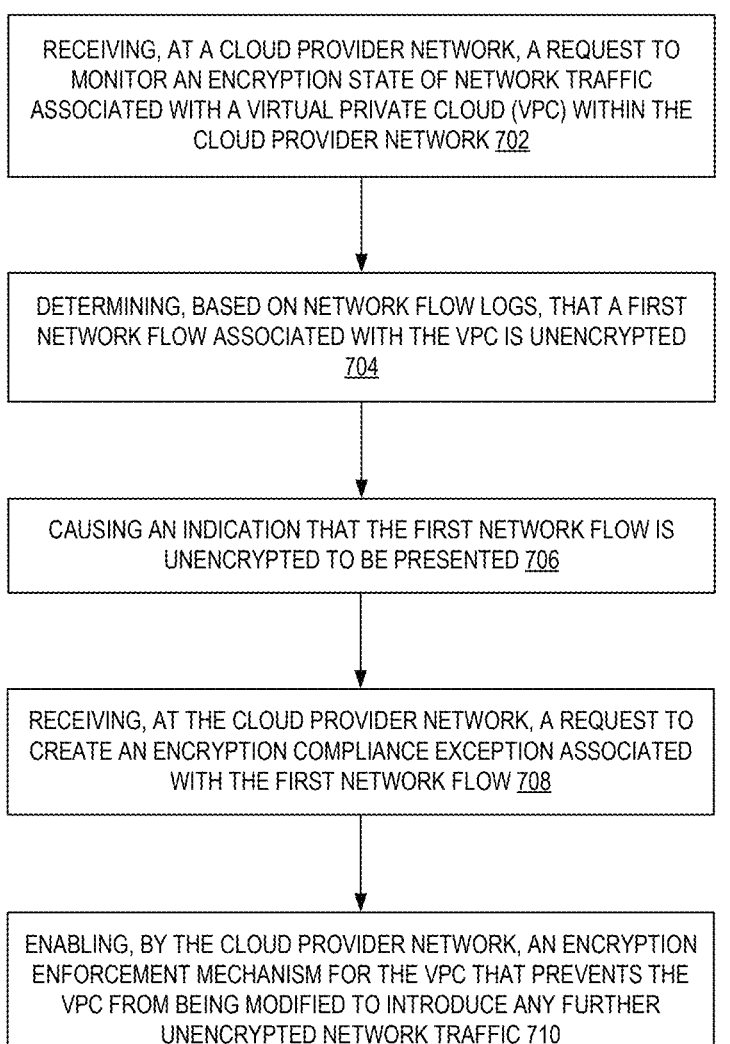

RECEIVING, AT A CLOUD PROVIDER NETWORK, A REQUEST TO MONITOR AN ENCRYPTION STATE OF NETWORK TRAFFIC ASSOCIATED WITH A VIRTUAL PRIVATE CLOUD (VPC) WITHIN THE CLOUD PROVIDER NETWORK 702

DETERMINING, BASED ON NETWORK FLOW LOGS, THAT A FIRST NETWORK FLOW ASSOCIATED WITH THE VPC IS UNENCRYPTED 704

CAUSING AN INDICATION THAT THE FIRST NETWORK FLOW IS UNENCRYPTED TO BE PRESENTED 706

RECEIVING, AT THE CLOUD PROVIDER NETWORK, A REQUEST TO CREATE AN ENCRYPTION COMPLIANCE EXCEPTION ASSOCIATED WITH THE FIRST NETWORK FLOW 708

ENABLING, BY THE CLOUD PROVIDER NETWORK, AN ENCRYPTION ENFORCEMENT MECHANISM FOR THE VPC THAT PREVENTS THE VPC FROM BEING MODIFIED TO INTRODUCE ANY FURTHER UNENCRYPTED NETWORK TRAFFIC 710

*FIG. 7*

IDENTIFYING UNENCRYPTED NETWORK FLOWS USING VIRTUAL PRIVATE CLOUD ENCRYPTION CONTROLS

BACKGROUND

The term encryption-in-transit refers to the process of protecting data as it moves between different locations, such as between a user's device and a server, or between different systems such as cloud services or components, using encryption. This type of encryption can help ensure that data is secure from interception or tampering while it is being transmitted over networks. The primary goal is to maintain the confidentiality and integrity of the data during transit, preventing unauthorized access and ensuring that the data received is exactly what was sent.

Cloud providers implement encryption-in-transit through various mechanisms. For example, cloud providers may use protocols like TLS (Transport Layer Security) and SSL (Secure Sockets Layer) to encrypt data during transmission. These protocols establish a secure channel between the client and server, ensuring that any data exchanged is encrypted and protected. Additionally, cloud providers may offer VPN (Virtual Private Network) type services and dedicated private connections to secure data in transit. By leveraging these technologies, cloud providers help ensure that data remains protected as it moves across the internet and within their own infrastructure.

BRIEF DESCRIPTION OF DRAWINGS

Various examples in accordance with the present disclosure will be described with reference to the drawings, in which:

FIG. 2 is a diagram illustrating exemplary application programming interface (API) requests useful with virtual private cloud encryption controls according to some examples.

FIG. 6 is a flow diagram illustrating operations of a method for identifying unencrypted network flows via virtual private cloud encryption controls according to some examples.

FIG. 7 is a flow diagram illustrating operations of a method for implementing unencrypted network flow exceptions with virtual private cloud encryption controls according to some examples.

DETAILED DESCRIPTION

Many cloud customers, especially those in regulated industries like healthcare, finance, and government, have strict requirements to encrypt all data in transit. However, ensuring comprehensive encryption across complex cloud or hybrid environments can be a significant challenge. Cloud service providers may not always enable network encryption across all compute instances or services, and when encryption is available, it may occur at different levels in the networking stack. This makes it difficult for customers to know how fully their cloud applications have implemented encryption-in-transit, creating compliance risks and barriers to cloud migration.

Techniques of the present disclosure address these challenges, among others, by providing cloud customers with a centralized mechanism to enforce and monitor encryption for all network traffic within and between virtual private clouds (VPCs). In some examples, a set of cloud platform APIs are provided that allow customers to monitor and identify any unencrypted traffic flows within their cloud applications, including those occurring within the cloud provider's internal architecture. This gives customers the visibility and auditability they need to ensure their cloud workloads meet encryption requirements. In some examples, customers can also use an API to enforce the use of encryption-in-transit throughout their applications. Accordingly, attempts to change the application that would or could introduce unencrypted network flows are not allowed, ensuring network security for the application and providing compliance guarantees across potentially many components or applications.

In some examples, a complementary set of cloud platform APIs are introduced that allow customers to create exceptions where unencrypted traffic flows cannot be avoided, while still maintaining a comprehensive encryption-in-transit policy for the rest of their application. This flexibility helps customers balance their compliance needs with the practical realities of their cloud infrastructure. Together, these techniques give customers the control and confidence they need to migrate sensitive workloads to the cloud while meeting stringent data security and compliance standards.

Accordingly, the present disclosure relates to methods, apparatus, systems, and non-transitory computer-readable storage media for identifying unencrypted network flows and/or implementing unencrypted network flow exceptions via virtual private cloud (VPC) encryption controls. According to some examples, an encryption control system of a cloud provider network provides users with simple declarative controls allowing them to monitor and secure an encryption-in-transit posture for their applications at the VPC level.

Figure 1:
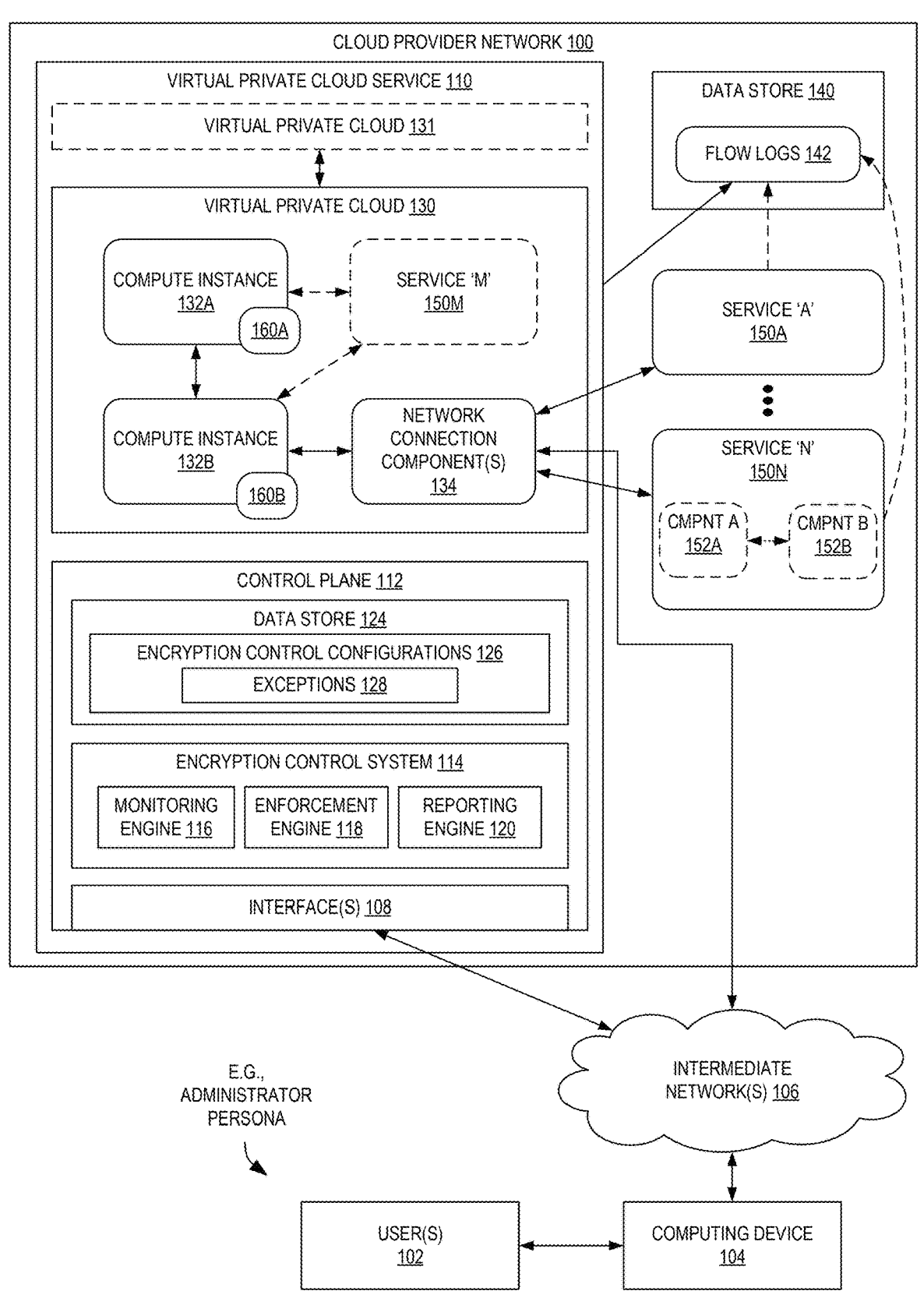
FIG. 1 is a diagram illustrating an environment implementing virtual private cloud encryption controls in a cloud provider network context according to some examples.

FIG. 1 is a diagram illustrating an environment implementing virtual private cloud encryption controls in a cloud provider network 100 context according to some examples. As shown, an encryption control system 114 of a virtual private cloud service 110 allows users 102 to monitor the encryption-in-transit status of network traffic of an application hosted in a virtual private cloud 130. The application, made up of compute instances 132A-132B and network connection components 134, also utilizes multiple services 150A-150N and/or a peered VPC 131 also hosted by the cloud provider network 100. In some examples, the application may also include one or more "VPC-local" services, illustrated as service 'M' 150M, which can provide similar or the same functionality as another cloud provider network 100 service. However, this functionality can be provided within a customer's VPC 130, such as by launching one or more compute instances implementing service functionality, instead of needing to interact with a service that, while still within the cloud provider network 100, exists outside of the VPC 130. In some examples, the compute instances 132A-132B are enabled to communicate via use of a logical or "virtual" network interface (VNI) 160A-160B (also referred to as an elastic network interface (ENI)) that represents a networking card. A VNI 160, in some examples, can be "attached" to a compute instance 132 to provide the instance with one or more network addresses—e.g., one or more private IPv6 and/or IPv6 addresses from a subnet of the VPC, one or more public (or "routable") IPv6 and/or IPv6 addresses, a MAC address, etc.

A cloud provider network 100 (also referred to herein as a provider network, service provider network, etc.) provides users with the ability to use one or more of a variety of types of computing-related resources such as compute resources (e.g., executing virtual machine (VM) instances and/or containers, executing batch jobs, executing code without provisioning servers), data/storage resources (e.g., object storage, block-level storage, data archival storage, databases and database tables, etc.), network-related resources (e.g., configuring virtual networks including groups of compute resources, content delivery networks (CDNs), Domain Name Service (DNS)), application resources (e.g., databases, application build/deployment services), access policies or roles, identity policies or roles, machine images, routers and other data processing resources, etc. These and other computing resources can be provided as services, such as a hardware virtualization service that can execute compute instances, a storage service that can store data objects, etc. The users (or "customers") of cloud provider networks 100 can use one or more user accounts that are associated with a customer account, though these terms can be used somewhat interchangeably depending upon the context of use. Cloud provider networks are sometimes "multi-tenant" as they can provide services to multiple different customers using the same physical computing infrastructure; for example, virtual machine instances may be concurrently hosted for different customers using a same underlying physical host computing device.

Users 102, via use of a computing device 104 such as a server computing device, personal computing device, or the like, can interact with a cloud provider network 100 across one or more intermediate networks 106 (e.g., the internet) via one or more interface(s) (e.g., interfaces 108 of a control plane 112), such as through use of application programming interface (API) calls, via a console implemented as a website or application, etc. An API refers to an interface and/or communication protocol between a client and a server, such that if the client makes a request in a predefined format, the server should respond with a response in a specific format or initiate a defined action. In the cloud provider network context, APIs provide a gateway for customers to access cloud infrastructure by allowing customers to obtain data from or cause actions within the cloud provider network, enabling the development of applications that interact with resources and services hosted in the cloud provider network. APIs can also enable different services of the cloud provider network to exchange data with one another. The interface(s) can be part of, or serve as a front-end to, a control plane of the cloud provider network 100 that includes "backend" services supporting and enabling the services that can be more directly offered to customers.

Thus, a cloud provider network (or just "cloud") typically refers to a large pool of accessible virtualized computing resources (such as compute, storage, and networking resources, applications, and services). A cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

A cloud provider network can include a physical network (e.g., sheet metal boxes, cables) referred to as the substrate. The cloud provider network can also include an overlay network of virtualized computing resources that run on the substrate. As such, network packets can be routed along a substrate network according to constructs in the overlay network (e.g., virtual private networks/clouds, virtual firewalls, and the like). A mapping service can coordinate the routing of these network packets. The mapping service can be a regional distributed look up service that maps the combination of overlay Internet Protocol (IP) address and network identifier to a substrate IP address so that the distributed substrate computing devices can look up where to send packets.

To illustrate, each physical host can have an IP address in the substrate network. Hardware virtualization technology can enable multiple operating systems to run concurrently on a host computer, for example as VMs on the host. A hypervisor, or virtual machine monitor (VMM), on a host allocates the host's hardware resources amongst various VMs on the host and monitors the execution of the VMs. Each VM can be provided one or more IP addresses in the overlay network, and the VMM on a host can be aware of the IP addresses of the virtual machines on the host. The VMMs (and/or other devices or processes on the network substrate) can use encapsulation protocol technology to encapsulate and route network packets (e.g., client IP packets) over the network substrate between virtualized resources on different hosts within the cloud provider network. The encapsulation protocol technology can be used on the network substrate to route encapsulated packets between endpoints on the network substrate via overlay network paths or routes. The encapsulation protocol technology can be viewed as providing a virtual network topology overlaid on the network substrate. The encapsulation protocol technology can include the mapping service that maintains a mapping directory that maps IP overlay addresses (e.g., public IP addresses) to substrate IP addresses (e.g., private IP addresses), which can be accessed by various processes on the cloud provider network for routing packets between endpoints.

Generally, the traffic and operations of a provider network can broadly be subdivided into two categories: control plane operations carried over a logical control plane and data plane operations carried over a logical data plane. While the data plane represents the movement of user data through the distributed computing system, the control plane represents the movement of control signals through the distributed computing system. The control plane generally includes one or more control plane components distributed across and implemented by one or more control servers. Control plane traffic generally includes administrative operations, such as system configuration and management (e.g., resource placement, hardware capacity management, diagnostic monitoring, system state information). The data plane includes user resources that are implemented on the provider network (e.g., computing instances, containers, block storage volumes, databases, file storage). Data plane traffic generally includes non-administrative operations, such as transferring user data to and from the user resources. The control plane components are typically implemented on a separate set of servers from the data plane servers, and control plane traffic and data plane traffic can be sent over separate/distinct networks.

To provide these and other computing services, cloud provider networks 100 often rely upon virtualization techniques. For example, virtualization technologies can provide users the ability to control or use compute resources (e.g., a "compute instance," such as a VM using a guest operating system (O/S) that operates using a hypervisor that might or might not further operate on top of an underlying host O/S, a container that might or might not operate in a VM, a compute instance that can execute on "bare metal" hardware without an underlying hypervisor), where one or multiple compute resources can be implemented using a single electronic device. Thus, a user can directly use a compute resource (e.g., provided by a hardware virtualization service) hosted by the provider network to perform a variety of computing tasks. Additionally, or alternatively, a user can indirectly use a compute resource by submitting code to be executed by the provider network (e.g., via an on-demand code execution service), which in turn uses one or more compute resources to execute the code-typically without the user having any control of or knowledge of the underlying compute instance(s) involved.

As described herein, one type of service that a provider network may provide may be referred to as a "managed compute service" that executes code or provides computing resources for its users in a managed configuration. Examples of managed compute services include, for example, an on-demand code execution service, a hardware virtualization service, a container service, or the like.

In a common cloud shared responsibility model, the cloud provider will be responsible for protecting the infrastructure that runs all of the services it offers. This infrastructure includes the hardware, software, networking, and facilities that implement the cloud services that are offered. Customers, then, are responsible for managing their data (including application encryption options), classifying their assets, and using tools to apply the appropriate permissions or access controls.

Customers in healthcare, government (or government adjacent) fields, and other verticals are sometimes required by various compliance standards to encrypt data in-transit when running certain applications for data protection reasons. Third party applications that do not support encryption, or customers who are unable to implement encryption in-transit at the application layer, end up having cloud migration challenges as they discover they are unable to meet these requirements.

In a cloud provider network 100, these challenges are often centered around the operations and configuration of a VPC 130. A virtual private cloud (VPC) (also referred to as a virtual network (VNet), virtual private network, or virtual cloud network, in various implementations) is a custom-defined, virtual network within another network, such as a cloud provider network. A VPC can be defined by at least its address space, internal structure (e.g., the computing resources that comprise the VPC, security groups), and transit paths, and is logically isolated from other virtual networks in the cloud. A VPC can span all of the availability zones in a particular region. A VPC can provide the foundational network layer for a cloud service, for example a compute cloud or an edge cloud, or for a customer application or workload that runs on the cloud. A VPC can be dedicated to a particular customer account (or set of related customer accounts, such as different customer accounts belonging to the same business organization). Customers can launch resources, such as compute instances, into their VPC(s). When creating a VPC, a customer can specify a range of IP addresses for the VPC in the form of a Classless Inter-Domain Routing (CIDR) block. After creating a VPC, a customer can add one or more subnets in each availability zone or edge location associated with its region.

In some examples, a VPC service 110 can provide network encryption functionalities such as VPC encryption, which can ensure instance-to-instance traffic encryption. For example, some "types" of compute instances offered by a cloud provider network 100 may automatically encrypt all instance-to-instance traffic without any noticeable performance impact.

However, in some use cases there may be gaps that exist in certain network segments or configurations, as well as the use of some compute instance types that do not natively utilize (or support) encryption. Some customers requiring encryption-in-transit capabilities may thus use network level point-to-point mechanisms, such as Internet Protocol Security (IPSec), which are hard to manage and become extremely burdensome as these networks grow/scale. Further, the lack of visibility into encryption status may also be a pain point to plan for a fully encrypted migration.

Accordingly, customers may need to carefully select compute instances for use to ensure they are using the right instances with the right networking cards to benefit from encryption. Additionally, it may be the case that while traffic of a primary VPC is encrypted, other "peered" VPCs and other services or serverless applications that the primary VPC utilizes may not be fully encrypted. Auditing and visibility concerns thus exist, as users may not have audit capabilities to ensure their data in transit is encrypted within their VPC or within other portions of the cloud provider network that they do not control.

Accordingly, in examples disclosed herein, a virtual private cloud service 110 may provide an encryption control system 114 supporting VPC encryption controls to enable customers to meet their compliance and security needs by enforcing encryption-in-transit and providing visibility for intra- and inter-VPC traffic. In some examples, via VPC encryption controls, customers can simply build an encryption boundary for data in transit encompassing their VPC and peered VPCs. Users can thus be provided with a VPC configuration that will ensure all data in transit will be encrypted, e.g., by ensuring that network interface 160 and/or service attachments are encryption capable. Users can also opt for utilizing VPC encryption controls in a monitor-only mode that provides flow level visibility into which segments of the network are encrypted. For services that may not support encryption, users can deploy those services in a regular VPC and peer it with an encryption enforced VPC.

As shown, these instances 132, components 134, services 150M, and other services 150 or VPCs 131 may interact via sending and receiving network traffic. This network traffic can be thought of in terms of network flows, where a network flow is a summarization of a set of data packets sent from a source to a destination, which can be another host, a multicast group, a broadcast domain, etc. In some cases, a network flow can be referenced by a collection of metadata, such as a unique combination of source and destination addresses and port numbers, together with a transport protocol utilized (for example, UDP or TCP). Network traffic may be encrypted using protocols like SSL or TLS, which convert readable data into an unreadable format to protect it from unauthorized access. Other types of encryption techniques known to those of skill in the art, often operating at the application layer or using encapsulation techniques, can additionally or alternatively be used to encrypt portions of network traffic to protect sensitive information. When network traffic is not encrypted, however, it remains vulnerable to interception and potential data breaches.

Accordingly, in some examples, an encryption control system 114 is provided as part of a control plane 112 of a virtual private cloud service 110 to implement VPC encryption controls for its users. The encryption control system 114 may include a monitoring engine 116 to determine and monitor an encryption status/posture of an application (as implemented in whole or in part in a VPC 130) for encryption controls operating in a "monitor" mode, while an enforcement engine 118 can prevent applications operating with full encryption-in-transit from being modified in such a way that could or would introduce unencrypted traffic for encryption controls operating in an "enforce" mode. Further, a reporting engine 120 can provide visibility of the monitoring and/or enforcement of encryption controls, such as by generating responses for API calls (sent via interfaces 108), providing data for user interfaces such as web-based graphical user interfaces (GUIs) for dashboards, reporting interfaces, control interfaces, or the like.

For example, a user 102 may seek to implement an encryption control for a VPC 130 in "monitor" mode to gain insight into which network flows associated with the VPC 130 are encrypted and/or are not encrypted. Thus, the user 102 may cause, via use of computing device 104, a "create VPC encryption control" type request (e.g., an API request) destined to the virtual private cloud service 110, which arrives via interfaces 108 and provided to the encryption control system 114. This request carries data used to create an encryption control configuration 126, which can be stored in a data store 124 such as a database, file, or other data structure. The request may identify a particular VPC 130 such as by specifying a VPC unique identifier and may include a mode value indicating whether the encryption control is to be in monitor or enforce mode. In some examples, the request may also provide one or more exceptions, or "encryption compliance exceptions", indicating types of network connection components or VPC peering designations that may or may not be used in the VPC (where these may potentially introduce, or actively do have, associated unencrypted flows).

For example, turning ahead, FIG. 2 is a diagram illustrating exemplary application programming interface (API) requests useful with virtual private cloud encryption controls according to some examples. Here, an example format for a create VPC encryption control request 202 is shown, where the request name/type is create-vpc-encryption control, a vpc-id parameter allows the caller to provide a value identifying a VPC, a mode parameter allows the caller to provide an indication of the requested mode of operation for the control (here, monitor or enforce), and a variety of exceptions indicating virtual network components that can be allowed (that may be associated with unencrypted network flows), such as internet gateways (IGWs) providing connectivity from the VPC to the internet, NAT (Network Address Translation) gateways providing connectivity from the VPC to a service of the cloud provider network, egress-only-internet gateways providing outbound connectivity from the VPC to the internet, virtual private gateways providing connectivity from the VPC to another network, etc. The exceptions also include a parameter allowing VPC peering to be enabled for the VPC, where a peered VPC may not necessarily be fully encrypted in transit.

This create VPC encryption control request 202 may have corresponding API calls that are supported as well, such as a corresponding "modify" or "update" VPC encryption control request 204 to update some or all of the configuration, a "delete" VPC encryption control request to remove the VPC encryption control, a "describe" VPC encryption control request 206, etc.

Turning back to FIG. 1, upon receipt of this request, the associated data carried therein can be persisted as encryption control configuration 126 and the monitoring engine 116 can begin monitoring the VPC 130. This can include, for example, causing flow logs 142 to be generated (and sent to a data store 140) for the components of the VPC 130 and potentially some/all connected services 150 or peered VPCs 131, where these flow logs 142 include, for each network flow, a designation of the encryption posture of the flow—e.g., a designation of whether the flow utilizes some sort of encryption-in-transit, perhaps an indication of what type or technology is used, or the like.

Flow logs, as known to those of skill in the art, can capture per-flow metadata for current or recent network traffic associated with the VPC, whether in the VPC 130 itself, and/or in connected services 150 or VPCs 131. Flow logs, in some examples, are generated for a particular network interface (e.g., VNIs 160A-160B). As an example, a flow log for a NAT gateway network interface may capture the following fields in the following order: an instance-id, an interface-id, a source address (srcaddr), a destination address (dstaddr), a packet source address (pkt-srcaddr), and a packet destination address (pkt-dstaddr). Thus, the flow log may show a flow of traffic from an instance IP address (10.0.1.5) through the NAT gateway network interface to a host on the internet (203.0.113.5). The NAT gateway network interface is a requester-managed network interface, therefore the flow log record may display a '-' symbol for the instance-id field. As the following line shows traffic from a source instance to the NAT gateway network interface, the values for the dstaddr and pkt-dstaddr fields are different. The dstaddr field displays the private IP address of the NAT gateway network interface, and the pkt-dstaddr field displays the final destination IP address of the host on the internet.

eni-1235b8ca123456789  10.0.1.5  10.0.0.220  10.0.1.5
     203.0.113.5

As indicated, in some examples, this flow log entry can be modified to include one or more additional fields indicative of the encryption posture of the flow. For example, a final field of (is-encrypted) can be added that is set as a zero (0) if the flow is not observed to be encrypted or a (1) if the flow is observed to be encrypted. As another example, the flow log could be modified to include a field indicating a type of the encryption, e.g., in the form of a protocol and version (e.g., "TLS 1.3").

In some examples, the monitoring engine 116 causes reporting of flow logs 142 to begin for a first time for components of the VPC 130 (and associated services/VPCs), though in other examples it may be that flow logs 142 are already being generated but now the monitoring engine 116 causes these reporting systems to add the additional encryption status information therein. In some examples, these flow logs 142 are generated by the virtual private cloud service 110 and optionally involved services 150 and may include flow logs corresponding to provider-managed components (e.g., component 'A' 152A and component 'B' 152B) that the user may not even be aware of or otherwise have visibility into.

In some examples, a user may need to further modify the flow logs that are visible to that user, in addition to the underlying flow logs being generated/collected by the provider network itself that may not be directly provided to users. Thus, returning to FIG. 2, in some examples a user may call a "create flow logs" request 208 (or similar "modify" flow logs request) to modify which data is visible for that user's VPC-here, two additional fields 210 are added to the end of a "log format" parameter indicating that the user seeks to view an indicator of whether instance-level encryption is enabled, application-level encryption is enabled (e.g., at L4 or L7 of the OSI model), etc. This indicator can be a binary type value (e.g., Yes/No, 0/1, True/False) or a different type value, such as a value from a defined set (e.g., 0 is No, 1 is Yes, 2 is unknown), a textual value indicating a specific type or configuration of encryption being used (e.g., a protocol, cipher, etc.), etc.

In some examples, the flow logs 142 shown in FIG. 1 are sent to a data store 140 such as a log collection service, a cloud monitoring and observability service, an analytics service, an object storage service, or the like, allowing the user 102 themselves to analyze individual flow log 142 entries to manually determine if all reported network flows for (or associated with) a particular VPC have encryption enabled.

However, in some examples, the encryption control system 114 (e.g., via the monitoring engine 116 and/or reporting engine 120) can provide analysis functionalities involving this flow log 142 information. For example, the encryption control system 114 can obtain the flog log data (and/or query the data) to determine whether all associated network flows are encrypted or not encrypted, and can provide this information to the user 102 via an API response type message, via a notification, via an interface such as a GUI of a console or dashboard type application (examples of which are presented later herein), or the like. For example, upon detecting an unencrypted network flow, the encryption control system 114 can cause an alarm or alert to be generated, such as via messages or notifications to particular users or user groups, messages to particular automated response systems, updates to a graphical user interface, or the like. Alternatively, or additionally, the virtual private cloud service 110 could provide users with a script or functionality (for cloud-based execution or remote execution) to perform this analysis and generating reporting, easing the burden for the end users.

In some cases, if a user 102 detects an unencrypted network flow, the user may thereafter modify their application (e.g., VPC settings, instance types used, network connection components 134 used, services 150 used, peered VPCs 131, overall architecture, etc.) to remove these encrypted flows. In time, per the monitoring, any unencrypted flows may disappear (e.g., due to "aging out" and not being seen in a recent window of time).

However, in some cases an unencrypted aspect may not be able to be eliminated. For example, the user may not care that an unencrypted flow is going from a compute instance via an egress-only internet gateway, or from the VPC to a peer VPC. In such cases, the user may seek to send the virtual private cloud service 110 a request to create an encryption compliance exception associated with a particular network flow. This request can be, for example, a "modify" VPC encryption control request with an exception parameter set indicating that a type of network connection component 134 is allowed to be used in the VPC 130, that the VPC 130 is allowed to be peered to other VPCs, etc. This data can be stored in a set of encryption control exceptions 128.

Thereafter, a user may seek to enable an enforcement mode for the encryption control and send a request to change the encryption control configuration 126 to reflect that it is in an "enforce" mode. This can cause an enforcement engine 118 to initially audit the flow logs 142 to ensure that there are not any unencrypted flows happening (that are not "excepted" via a set of encryption control exceptions 128). If any are found, the request can be denied, and the user can try again when all encrypted network flows are eliminated or excepted.

When a request to enforce the VPC encryption control is received and the enforcement engine 118 determines that no problematic unencrypted flows exist, the enforcement engine 118 can act to prevent actions from occurring in the VPC that would (or could) lead to an unencrypted network flow.

In some examples, the enforcement engine 118 can cause a flag to be set (or other "guardrails" to be created) indicating that the VPC is in an encryption enforcement mode, and thus, other control plane components of the cloud provider network 100 may be prevented from performing certain functions involving the VPC. In some examples, a known set of actions that could occur in association with a VPC that could lead to an unencrypted flow are modified to include a check ensuring that enforcement mode is not disabled. These actions could involve a request to "attach" some sort of service or VPC to the VPC, commonly via the creation or configuration of a virtual network connection component 134, and/or the attachment or creation of a network interface 160 for a compute instance, for example, which ordinarily allows a computing instance to communicate with other services, the internet, etc. Thus, in some examples, functions of the cloud provider network 100 can be instrumented with a logical check (to ensure enforcement mode is not active for the associated VPC) prior to performing these actions, such as creating a NAT gateway, launching a particular type of compute instance, attaching an interface 160 to an instance that is non-encrypted, connecting a service to the VPC that is non-fully-encrypted in transit, or the like. In this manner, changes can be made that add additional encrypted network flows, but changes cannot be made that would add unencrypted network flows.

In some examples, when in "enforce" mode, the encryption control system 114 can continue to monitor the status of network traffic to continually watch for any unencrypted network traffic that could arise. In some examples, if unencrypted network traffic is detected, per configuration the encryption control system 114 can act responsively, such as by performing one or more responsive actions like alerting or alarming users, causing the unencrypted traffic to be dropped (e.g., no longer forwarded or routed along its path) or blocked, causing the traffic to undergo additional security measures, terminating network and/or application components, or the like.

Figure 3:
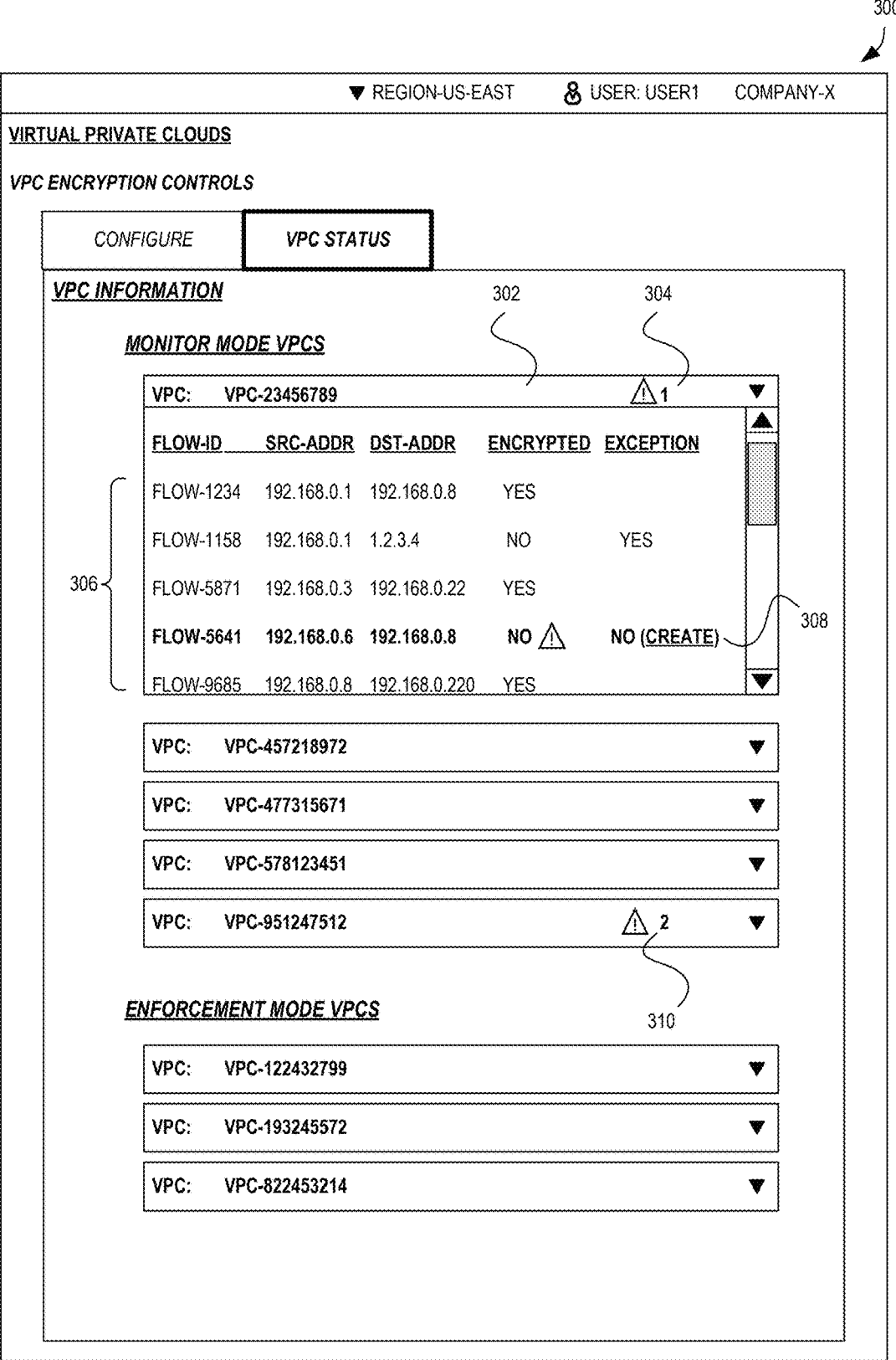
FIG. 3 is a diagram illustrating an exemplary graphical user interface for showing network flow information from monitored virtual private clouds, including unencrypted network flows, according to some examples.

As indicated herein, the encryption control system 114 (e.g., via reporting engine 120) can optionally provide useful insight for users into the encryption status of their applications via reporting back VPC-associated encryption-in-transit information. FIG. 3 is a diagram illustrating an exemplary graphical user interface 300 for showing network flow information from monitored virtual private clouds, including unencrypted network flows, according to some examples.

In some examples, the reporting engine 120 can provide data for this GUI 300, such as by transmitting HTML type data (or similar, such as CSS, JavaScript, or the like) to cause this GUI 300 to be presented to a user. In this example, a user is provided a summarization interface showing the encryption status of multiple VPCs associated with the user—e.g., "owned" by the user, by a group the user is a part of, by a larger organization or customer account the user is associated with, etc. As shown, a first set of graphical user interface elements (here, expandable boxes or expandable panels) are shown corresponding to VPCs that are currently set in a "monitor" mode, and at the bottom, a second set of elements are shown for three VPCs that have a VPC encryption control in "enforce" mode.

In this example, a first user interface element 302 for a particular VPC (VPC-23456789) is shown with an identifier of the VPC, a warning indicator 304 indicating a number of network flows that are unencrypted, and numerous entries 306 corresponding to observed network flows associated with the VPC. Here, a few fields describing each flow are shown, such as a flow identifier, a source address, a destination address, an encryption identifier (indicating whether encrypted is enabled), an exception identifier (indicating whether an exception has been created that applies to, or "excepts", the network flow). As shown, three of the visible flows are shown as encrypted, while one is unencrypted but excepted, and one flow 308 is not encrypted and no such exception applies. In this example, a text link user interface elements is shown allowing a user to quickly generate an exception associated with the flow, e.g., by showing a "pop-up" interface (or a separate panel) enabling the user to configure an exception. This can include recommending a type of exception for the network flow, such as by determining that the flow involves a particular type of virtual network connection component that an exception could be created for. Additionally, the GUI 300 shows another VPC in monitor mode that has unencrypted network flows, which is reflected by the icon and "2" indicator at 310, indicating that two network flows associated with the VPC are unencrypted.

Such an interface can be beneficial for a variety of types of users for a variety of reasons, such as by a user monitoring the own VPCs, a user seeking visibility into a variety of VPCs of others (e.g., as part of an acquisition of another company's resources, whereby a security posture of those resources can be quickly identified, exceptions can be identified, etc.), a managerial user seeking a broad view of an entire organization's resources and their encryption state, and the like.

Figure 4:
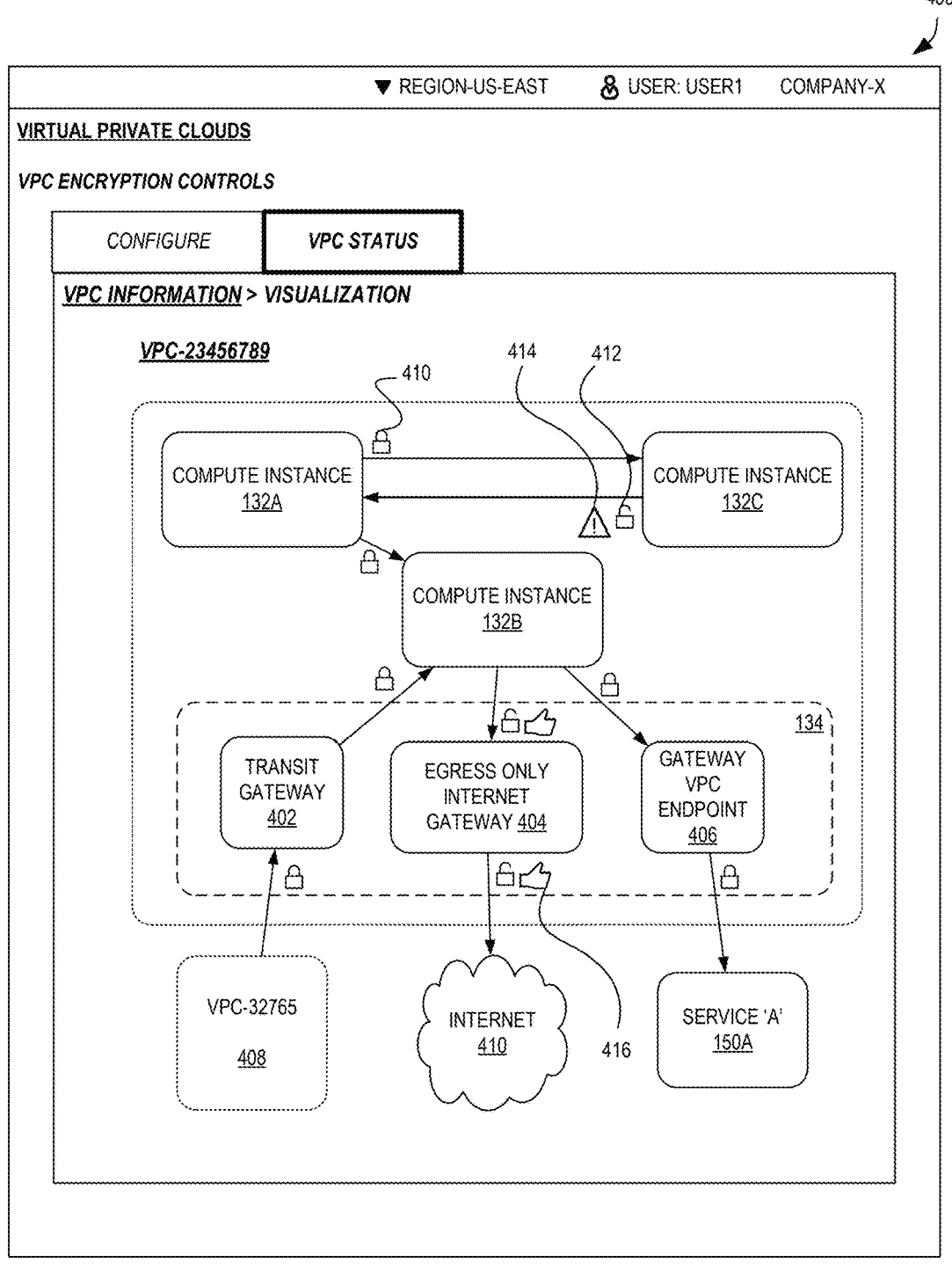
FIG. 4 is a diagram illustrating an exemplary graphical user interface for visually illustrating an application with network flow information involving a monitored virtual private cloud according to some examples.

FIG. 4 is a diagram illustrating an exemplary graphical user interface 400 for visually illustrating an application with network flow information involving a monitored virtual private cloud according to some examples. In this example, a visualization of a VPC and its resources and connections can be generated and displayed to provide both an easy-to-comprehend view into a particular VPC and its encryption state. Here, the VPC is shown as including three compute instances 132A-132C and several virtual network connection components 134, including a transit gateway 402 connecting the VPC to another VPC 408 ("VPC-32765"), an egress-only internet gateway 404 leading to the internet 410, and a gateway VPC endpoint 406 providing connectivity to another service 'A' 150A of the provider network.

In this example, various network flows observed between these components are illustrated using arrows. These arrows are also shown alongside various icons that can indicate characteristics of these flows; namely, an encryption status is shown using "locked" or "unlocked" padlocks 410, 412, where a locked padlock 410 indicates that the corresponding network flow is encrypted, and an unlocked padlock 412 indicates that it is not. Additionally, a warning triangle 414 icon is displayed to indicate that an unencrypted network flow is not covered by an exception, whereas a "thumbs up" icon 416 is displayed to indicate that an unencrypted network flow is covered by an exception. Of course, many other visual techniques can be used to communicate this type of information, such as the use of colors, fonts, font weights, other shapes or icons, illustrations, etc. In some examples, these aspects can be further explored by a user, such as by hovering over or clicking/selecting these icons or shapes/lines, where flow log information could be displayed, instance information could be displayed, encryption information could be displayed, etc.

Figure 5:
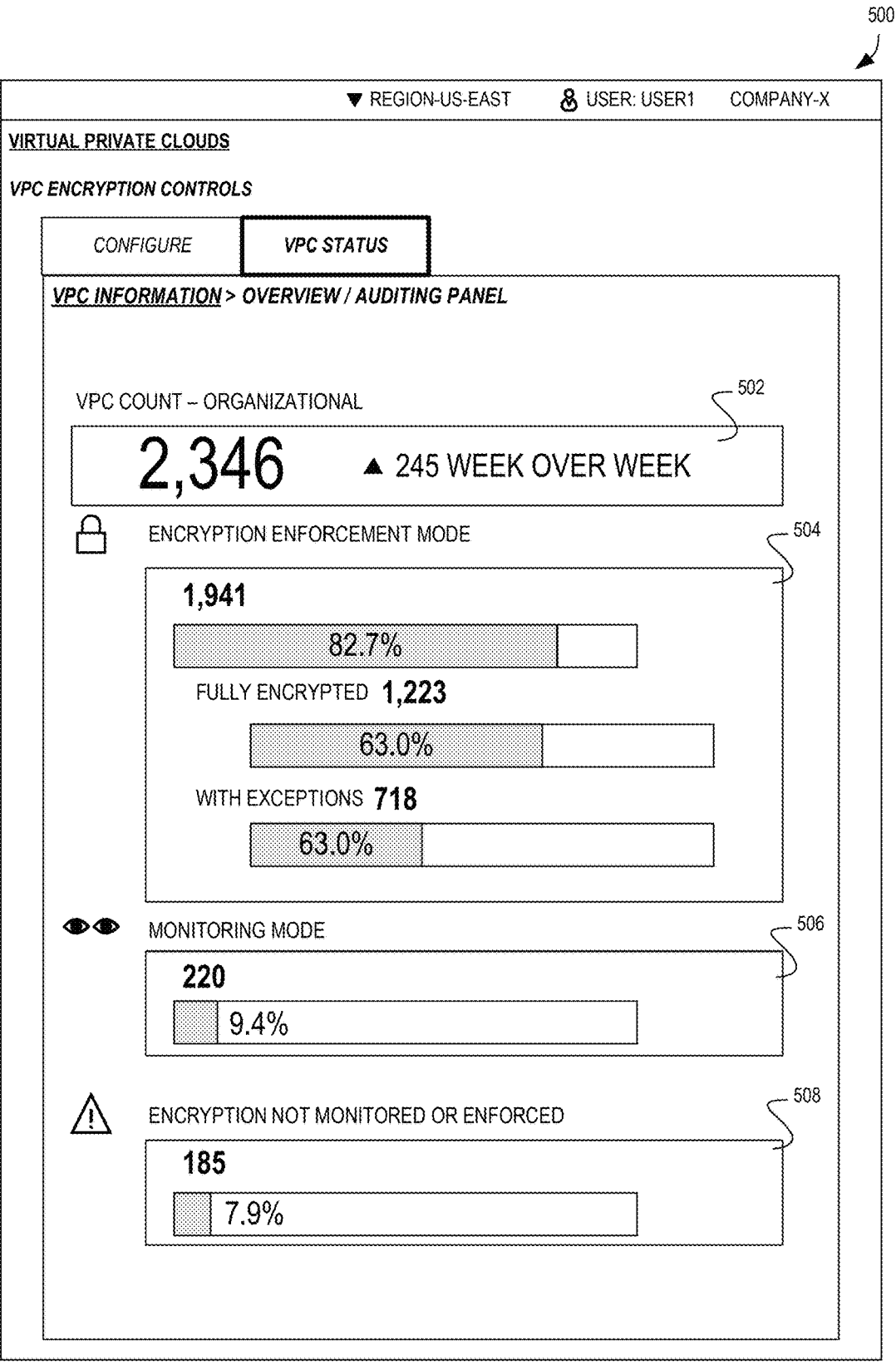
FIG. 5 is a diagram illustrating an exemplary dashboard type graphical user interface for observing encryption-in-transit related information for monitored virtual private clouds according to some examples.

FIG. 5 is a diagram illustrating an exemplary dashboard type graphical user interface 500 for observing encryption-in-transit related information for monitored virtual private clouds according to some examples. In this example, an organizational or auditing dashboard is provided showing a high-level view of the encryption compliance status associated with a large number of VPCs. As shown, via user interface element 502, a total count of VPCs for an organization is presented (as 2,346), where 1,941 are shown to having an encryption control in enforcement mode, which is illustrated graphically using bar graphs within element 504. This element 504 indicates that of these 1,941 encryption control enforced VPCs (82.7% of all VPCs), 1,223 are fully-encrypted and 718 are encryption-compliant via exceptions.

Additionally, the interface 500 shows via panel 506 a number of the total VPCs that are in monitor mode, and panel 508 shows a number of the VPCs that are not subject to a VPC encryption control in either monitor or enforcement mode.

In some examples, this dashboard can provide a high-level overview of a larger organization, whereby high-level insights can first be displayed, and in some cases the interface can allow users to "drill-down" into these categories by clicking or selecting on the elements. For example, the user could select one of these panels (e.g., the monitoring mode panel 506) to view a list of those VPCs that are in the associated status (e.g., monitoring mode), which could be similar in presentation or functionality to the interface 300 of FIG. 3. That interface, then, could allow further "drilling down", such as by selecting a particular VPC to then see additional information about the particular VPC, perhaps via an interface such as interface 400 of FIG. 4.

In some examples, these systems can be further extended, such as through the use of organizational or group policies. For example, an organization policy could be set to indicate that any VPC that is created in the organization must have a VPC encryption control in monitor or enforcement mode, perhaps immediately or within some amount of time after creation. The policy could also indicate which types of exceptions are allowed and/or are not allowed. Violations could be configured to exist (but cause warnings or notifications to be sent to other stakeholder users for monitoring) or else not be allowed whatsoever.

Additionally, in some examples, upon a VPC encryption control being placed in a monitor mode and the monitoring engine 116 enabling (or confirming) encryption related network flow data to be reported, a service could be configured to automatically enable encryption on its own at that point. For example, a service may initially utilize unencrypted communications by default, but when an encryption control is created, this service may change its configuration (e.g., for that VPC or customer) to use encryption—e.g., components A 152A and B 152B in FIG. 1 could be switched to use encryption-in-transit for some or all of their communications. This could enable the service to provide unencrypted communications when it is not desired by most users, but then enable it when beneficial.

FIG. 6 is a flow diagram illustrating operations 600 of a method for identifying unencrypted network flows via virtual private cloud encryption controls according to some examples. Some or all of the operations 600 (or other processes described herein, or variations, and/or combinations thereof) are performed under the control of one or more computing devices configured with executable instructions, and are implemented as code (e.g., executable instructions, one or more computer programs, or one or more applications) executing collectively on one or more processors. The code is stored on a computer-readable storage medium, for example, in the form of a computer program comprising instructions executable by one or more processors. The computer-readable storage medium is non-transitory. In some examples, one or more (or all) of the operations 600 are performed by the encryption control system 114, virtual private cloud service 110, and/or the cloud provider network 100 of the other figures.

The operations 600 include, at block 602, receiving, at a cloud provider network, a request to monitor an encryption state of network traffic associated with a virtual private cloud (VPC) within the cloud provider network; at block 604, determining, based on network flow logs, that a first network flow associated with the VPC is unencrypted; and at block 606, causing an indication that the first network flow is unencrypted to be presented. The operations 600 further include, at block 608, receiving, at the cloud provider network, a request to create an encryption compliance exception associated with the first network flow; and at block 610, enabling, by the cloud provider network, an encryption enforcement mechanism for the VPC that prevents the VPC from being modified to introduce any further unencrypted network traffic.

FIG. 7 is a flow diagram illustrating operations 700 of a method for implementing unencrypted network flow exceptions with virtual private cloud encryption controls according to some examples. Some or all of the operations 700 (or other processes described herein, or variations, and/or combinations thereof) are performed under the control of one or more computing devices configured with executable instructions, and are implemented as code (e.g., executable instructions, one or more computer programs, or one or more applications) executing collectively on one or more processors. The code is stored on a computer-readable storage medium, for example, in the form of a computer program comprising instructions executable by one or more processors. The computer-readable storage medium is non-transitory. In some examples, one or more (or all) of the operations 700 are performed by the encryption control system 114, virtual private cloud service 110, and/or the cloud provider network 100 of the other figures.

The operations 700 include, at block 702, receiving, at a cloud provider network, a request to monitor an encryption state of network traffic associated with a virtual private cloud (VPC) within the cloud provider network; and at block 704, determining, based on network flow logs, that a first network flow associated with the VPC is unencrypted.

The operations 700 further include, at block 706, causing an indication that the first network flow is unencrypted to be presented; at block 708, receiving, at the cloud provider network, a request to create an encryption compliance exception associated with the first network flow; and at block 710, enabling, by the cloud provider network, an encryption enforcement mechanism for the VPC that prevents the VPC from being modified to introduce any further unencrypted network traffic.

Figure 8:
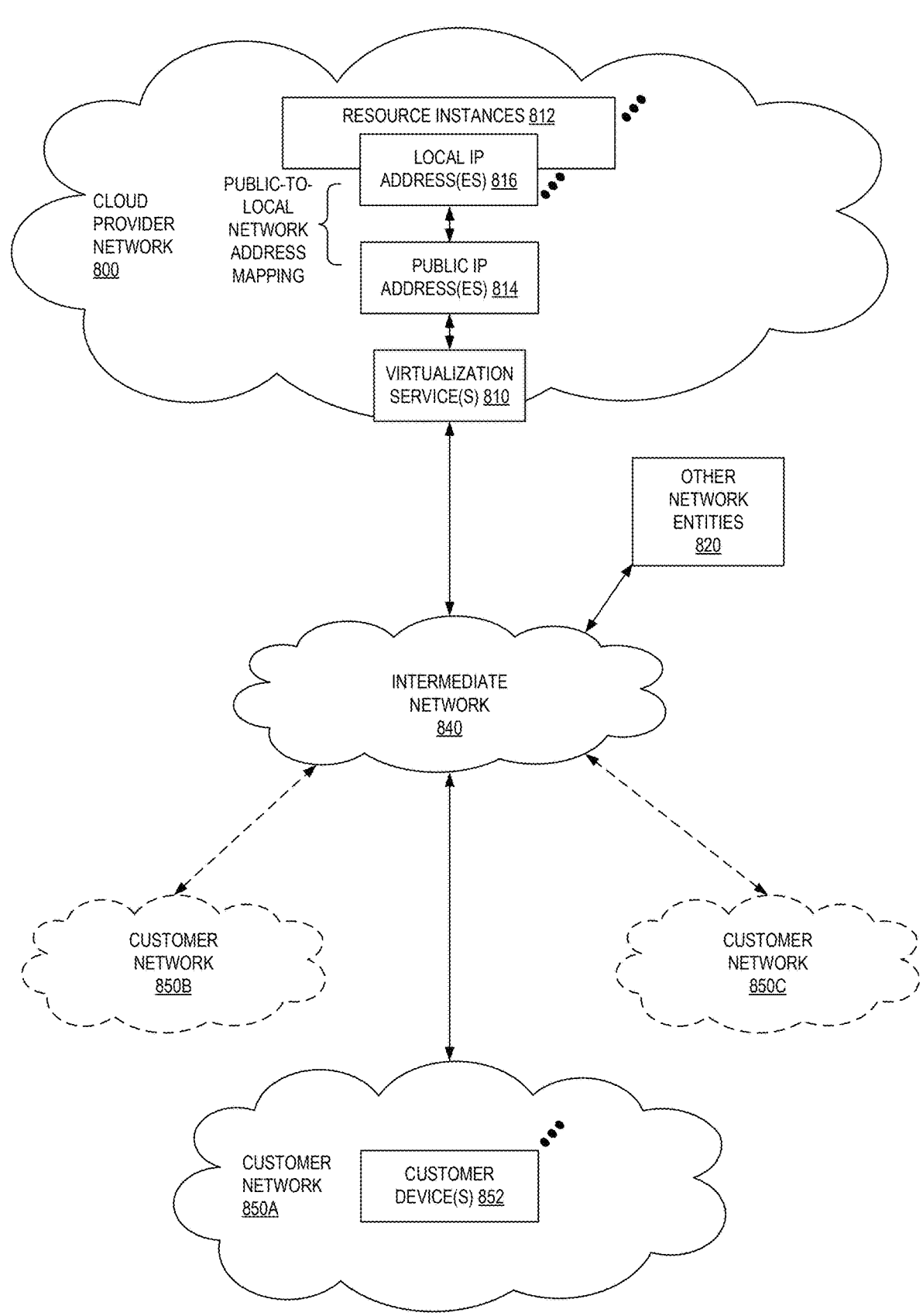
FIG. 8 illustrates an example cloud provider network environment according to some examples.

FIG. 8 illustrates an example provider network (or "service provider system") environment according to some examples. A provider network 800 can provide resource virtualization to customers via one or more virtualization services 810 that allow customers to purchase, rent, or otherwise obtain instances 812 of virtualized resources, including but not limited to computation and storage resources, implemented on devices within the provider network or networks in one or more data centers. Local Internet Protocol (IP) addresses 816 can be associated with the resource instances 812; the local IP addresses are the internal network addresses of the resource instances 812 on the provider network 800. In some examples, the provider network 800 can also provide public IP addresses 814 and/or public IP address ranges (e.g., Internet Protocol version 4 (IPv4) or Internet Protocol version 6 (IPv6) addresses) that customers can obtain from the provider 800.

Conventionally, the provider network 800, via the virtualization services 810, can allow a customer of the service provider (e.g., a customer that operates one or more customer networks 850A-850C (or "client networks") including one or more customer device(s) 852) to dynamically associate at least some public IP addresses 814 assigned or allocated to the customer with particular resource instances 812 assigned to the customer. The provider network 800 can also allow the customer to remap a public IP address 814, previously mapped to one virtualized computing resource instance 812 allocated to the customer, to another virtualized computing resource instance 812 that is also allocated to the customer. Using the virtualized computing resource instances 812 and public IP addresses 814 provided by the service provider, a customer of the service provider such as the operator of the customer network(s) 850A-850C can, for example, implement customer-specific applications and present the customer's applications on an intermediate network 840, such as the Internet. Other network entities 820 on the intermediate network 840 can then generate traffic to a destination public IP address 814 published by the customer network(s) 850A-850C; the traffic is routed to the service provider data center, and at the data center is routed, via a network substrate, to the local IP address 816 of the virtualized computing resource instance 812 currently mapped to the destination public IP address 814. Similarly, response traffic from the virtualized computing resource instance 812 can be routed via the network substrate back onto the intermediate network 840 to the source entity 820.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193 and can be mutable within the provider network. Network traffic originating outside the provider network is not directly routed to local IP addresses; instead, the traffic uses public IP addresses that are mapped to the local IP addresses of the resource instances. The provider network can include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses can be assigned by the provider network infrastructure to particular resource instances; these public IP addresses can be referred to as standard public IP addresses, or simply standard IP addresses. In some examples, the mapping of a standard IP address to a local IP address of a resource instance is the default launch configuration for all resource instance types.

At least some public IP addresses can be allocated to or obtained by customers of the provider network 800; a customer can then assign their allocated public IP addresses to particular resource instances allocated to the customer. These public IP addresses can be referred to as customer public IP addresses, or simply customer IP addresses. Instead of being assigned by the provider network 800 to resource instances as in the case of standard IP addresses, customer IP addresses can be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 9:
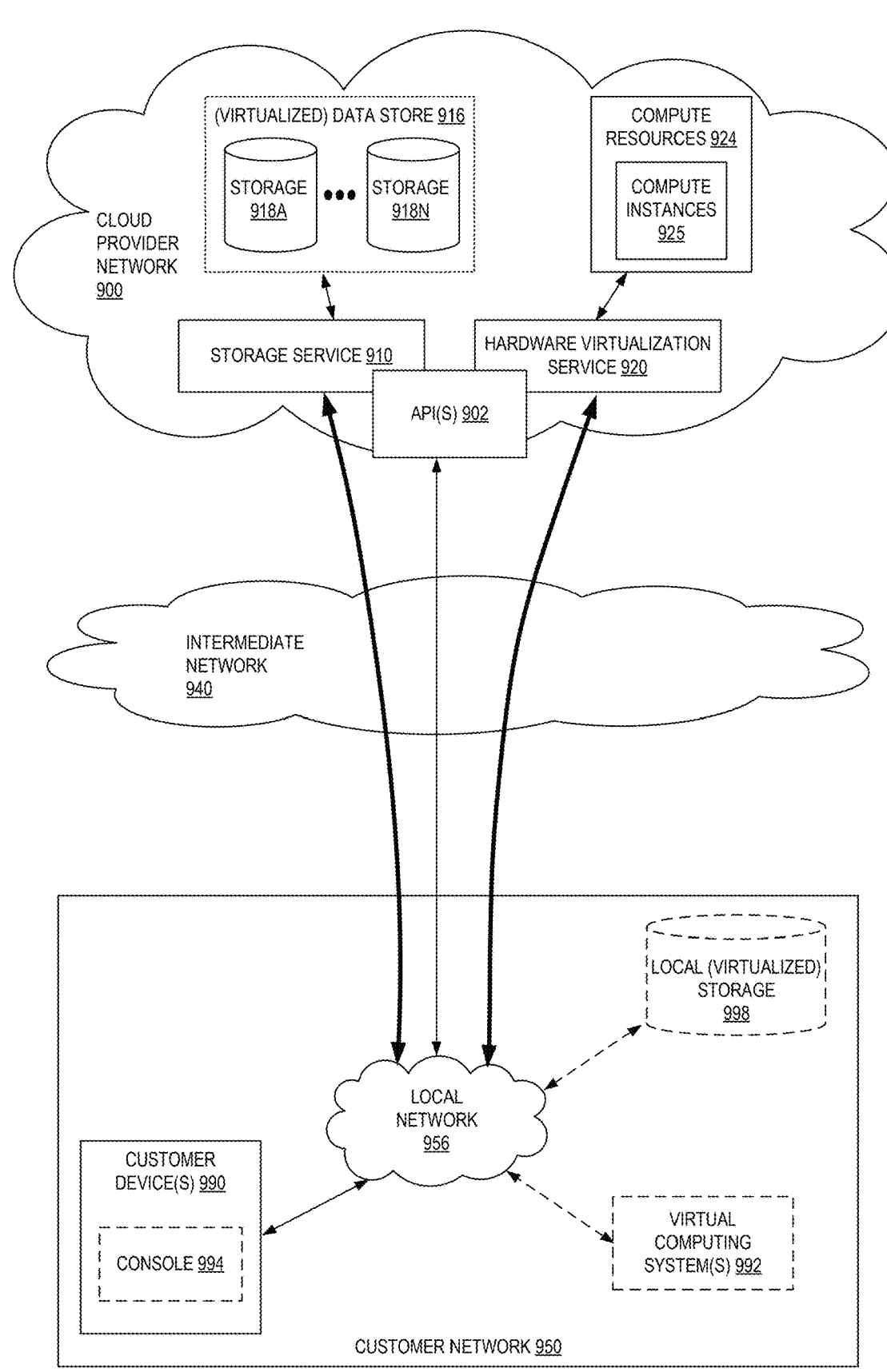
FIG. 9 is a block diagram of an example cloud provider network that provides a storage service and a hardware virtualization service to users according to some examples.

FIG. 9 is a block diagram of an example provider network environment that provides a storage service and a hardware virtualization service to users, according to some examples. A hardware virtualization service 920 provides multiple compute resources 924 (e.g., compute instances 925, such as VMs) to users. The compute resources 924 can, for example, be provided as a service to users (or "customers") of a provider network 900 (e.g., to a customer that implements a customer network 950). Each computation resource 924 can be provided with one or more local IP addresses. The provider network 900 can be configured to route packets from the local IP addresses of the compute resources 924 to public Internet destinations, and from public Internet sources to the local IP addresses of the compute resources 924.

The provider network 900 can provide the customer network 950, for example coupled to an intermediate network 940 via a local network 956, the ability to implement virtual computing systems 992 via the hardware virtualization service 920 coupled to the intermediate network 940 and to the provider network 900. In some examples, the hardware virtualization service 920 can provide one or more APIs 902, for example a web services interface, via which the customer network 950 can access functionality provided by the hardware virtualization service 920, for example via a console 994 (e.g., a web-based application, standalone application, mobile application, etc.) of a customer device 990. In some examples, at the provider network 900, each virtual computing system 992 at the customer network 950 can correspond to a computation resource 924 that is leased, rented, or otherwise provided to the customer network 950.

From an instance of the virtual computing system(s) 992 and/or another customer device 990 (e.g., via console 994), the customer can access the functionality of a storage service 910, for example via the one or more APIs 902, to access data from and store data to storage resources 918A-918N of a virtual data store 916 (e.g., a folder or "bucket," a virtualized volume, a database, etc.) provided by the provider network 900. In some examples, a virtualized data store gateway (not shown) can be provided at the customer network 950 that can locally cache at least some data, for example frequently accessed or critical data, and that can communicate with the storage service 910 via one or more communications channels to upload new or modified data from a local cache so that the primary store of data (the virtualized data store 916) is maintained. In some examples, a user, via the virtual computing system 992 and/or another customer device 990, can mount and access virtual data store 916 volumes via the storage service 910 acting as a storage virtualization service, and these volumes can appear to the user as local (virtualized) storage 998.

While not shown in FIG. 9, the virtualization service(s) can also be accessed from resource instances within the provider network 900 via the API(s) 902. For example, a customer, appliance service provider, or other entity can access a virtualization service from within a respective virtual network on the provider network 900 via the API(s) 902 to request allocation of one or more resource instances within the virtual network or within another virtual network.

Illustrative Systems

Figure 10:
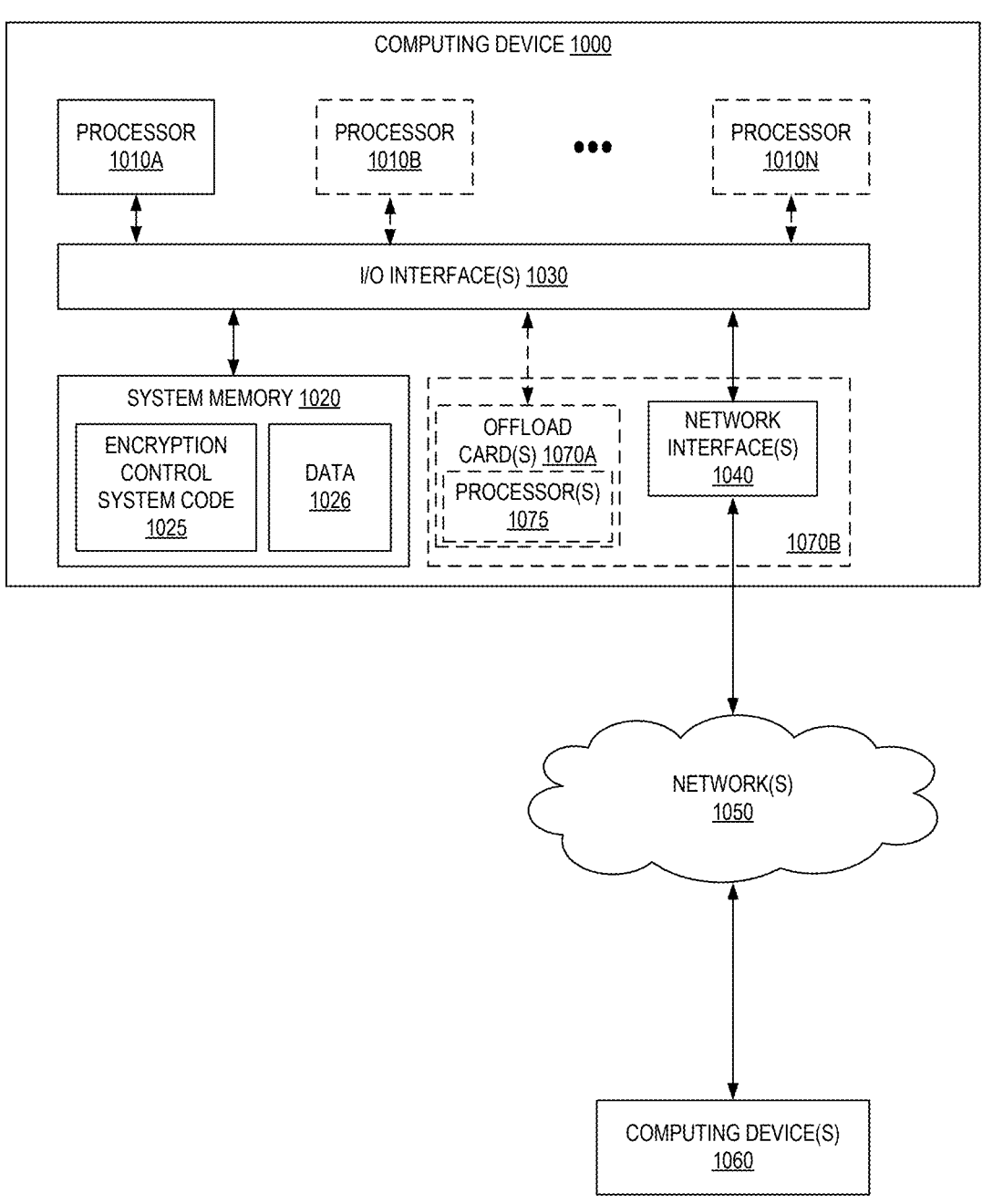
FIG. 10 is a block diagram illustrating an example computing device that can be used in some examples.

In some examples, a system that implements a portion or all of the techniques described herein can include a general-purpose computer system, such as the computing device 1000 (also referred to as a computing system or electronic device) illustrated in FIG. 10, that includes, or is configured to access, one or more computer-accessible media. In the illustrated example, the computing device 1000 includes one or more processors 1010 coupled to a system memory 1020 via an input/output (I/O) interface 1030. The computing device 1000 further includes a network interface 1040 coupled to the I/O interface 1030. While FIG. 10 shows the computing device 1000 as a single computing device, in various examples the computing device 1000 can include one computing device or any number of computing devices configured to work together as a single computing device 1000.

In various examples, the computing device 1000 can be a uniprocessor system including one processor 1010, or a multiprocessor system including several processors 1010 (e.g., two, four, eight, or another suitable number). The processor(s) 1010 can be any suitable processor(s) capable of executing instructions. For example, in various examples, the processor(s) 1010 can be general-purpose or embedded processors implementing any of a variety of instruction set architectures (ISAs), such as the x86, ARM, PowerPC, SPARC, or MIPS ISAs, or any other suitable ISA. In multiprocessor systems, each of the processors 1010 can commonly, but not necessarily, implement the same ISA.

The system memory 1020 can store instructions and data accessible by the processor(s) 1010. In various examples, the system memory 1020 can be implemented using any suitable memory technology, such as random-access memory (RAM), static RAM (SRAM), synchronous dynamic RAM (SDRAM), nonvolatile/Flash-type memory, or any other type of memory. In the illustrated example, program instructions and data implementing one or more desired functions, such as those methods, techniques, and data described above, are shown stored within the system memory 1020 as encryption control system code 1025 (e.g., executable to implement, in whole or in part, the encryption control system 114) and data 1026.

In some examples, the I/O interface 1030 can be configured to coordinate I/O traffic between the processor 1010, the system memory 1020, and any peripheral devices in the device, including the network interface 1040 and/or other peripheral interfaces (not shown). In some examples, the I/O interface 1030 can perform any necessary protocol, timing, or other data transformations to convert data signals from one component (e.g., the system memory 1020) into a format suitable for use by another component (e.g., the processor 1010). In some examples, the I/O interface 1030 can include support for devices attached through various types of peripheral buses, such as a variant of the Peripheral Component Interconnect (PCI) bus standard or the Universal Serial Bus (USB) standard, for example. In some examples, the function of the I/O interface 1030 can be split into two or more separate components, such as a north bridge and a south bridge, for example. Also, in some examples, some or all of the functionality of the I/O interface 1030, such as an interface to the system memory 1020, can be incorporated directly into the processor 1010.

The network interface 1040 can be configured to allow data to be exchanged between the computing device 1000 and other computing devices 1060 attached to a network or networks 1050, such as other computer systems or devices as illustrated in FIG. 1, for example. In various examples, the network interface 1040 can support communication via any suitable wired or wireless general data networks, such as types of Ethernet network, for example. Additionally, the network interface 1040 can support communication via telecommunications/telephony networks, such as analog voice networks or digital fiber communications networks, via storage area networks (SANs), such as Fibre Channel SANs, and/or via any other suitable type of network and/or protocol.

In some examples, the computing device 1000 includes one or more offload cards 1070A or 1070B (including one or more processors 1075, and possibly including the one or more network interfaces 1040) that are connected using the I/O interface 1030 (e.g., a bus implementing a version of the Peripheral Component Interconnect-Express (PCI-E) standard, or another interconnect such as a QuickPath interconnect (QPI) or UltraPath interconnect (UPI)). For example, in some examples the computing device 1000 can act as a host electronic device (e.g., operating as part of a hardware virtualization service) that hosts compute resources such as compute instances, and the one or more offload cards 1070A or 1070B execute a virtualization manager that can manage compute instances that execute on the host electronic device. As an example, in some examples the offload card(s) 1070A or 1070B can perform compute instance management operations, such as pausing and/or un-pausing compute instances, launching and/or terminating compute instances, performing memory transfer/copying operations, etc. These management operations can, in some examples, be performed by the offload card(s) 1070A or 1070B in coordination with a hypervisor (e.g., upon a request from a hypervisor) that is executed by the other processors 1010A-1010N of the computing device 1000. However, in some examples the virtualization manager implemented by the offload card(s)

1070A or 1070B can accommodate requests from other entities (e.g., from compute instances themselves), and cannot coordinate with (or service) any separate hypervisor.

In some examples, the system memory 1020 can be one example of a computer-accessible medium configured to store program instructions and data as described above. However, in other examples, program instructions and/or data can be received, sent, or stored upon different types of computer-accessible media. Generally, a computer-accessible medium can include any non-transitory storage media or memory media such as magnetic or optical media, e.g., disk or DVD/CD coupled to the computing device 1000 via the I/O interface 1030. A non-transitory computer-accessible storage medium can also include any volatile or non-volatile media such as RAM (e.g., SDRAM, double data rate (DDR) SDRAM, SRAM, etc.), read only memory (ROM), etc., that can be included in some examples of the computing device 1000 as the system memory 1020 or another type of memory. Further, a computer-accessible medium can include transmission media or signals such as electrical, electromagnetic, or digital signals, conveyed via a communication medium such as a network and/or a wireless link, such as can be implemented via the network interface 1040.

Various examples discussed or suggested herein can be implemented in a wide variety of operating environments, which in some cases can include one or more user computers, computing devices, or processing devices which can be used to operate any of a number of applications. User or client devices can include any of a number of general-purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and/or other devices capable of communicating via a network.

Most examples use at least one network that would be familiar to those skilled in the art for supporting communications using any of a variety of widely available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s) can include, for example, a local area network (LAN), a wide-area network (WAN), a virtual private network (VPN), the Internet, an intranet, an extranet, a public switched telephone network (PSTN), an infrared network, a wireless network, and any combination thereof.

In examples using a web server, the web server can run any of a variety of server or mid-tier applications, including HTTP servers, File Transfer Protocol (FTP) servers, Common Gateway Interface (CGI) servers, data servers, Java servers, business application servers, etc. The server(s) also can be capable of executing programs or scripts in response requests from user devices, such as by executing one or more Web applications that can be implemented as one or more scripts or programs written in any programming language, such as Java®, C, C# or C++, or any scripting language, such as Perl, Python, PHP, or TCL, as well as combinations thereof. The server(s) can also include database servers, including without limitation those commercially available from Oracle(R), Microsoft(R), Sybase(R), IBM(R), etc. The database servers can be relational or non-relational (e.g., "NoSQL"), distributed or non-distributed, etc.

Environments disclosed herein can include a variety of data stores and other memory and storage media as discussed above. These can reside in a variety of locations, such as on a storage medium local to (and/or resident in) one or more of the computers or remote from any or all of the computers across the network. In a particular set of examples, the information can reside in a storage-area network (SAN) familiar to those skilled in the art. Similarly, any necessary files for performing the functions attributed to the computers, servers, or other network devices can be stored locally and/or remotely, as appropriate. Where a system includes computerized devices, each such device can include hardware elements that can be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system can also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. It should be appreciated that alternate examples can have numerous variations from that described above. For example, customized hardware might also be used and/or particular elements might be implemented in hardware, software (including portable software, such as applets), or both. Further, connection to other computing devices such as network input/output devices can be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various examples.

In the preceding description, various examples are described. For purposes of explanation, specific configurations and details are set forth to provide a thorough understanding of the examples. However, it will also be apparent to one skilled in the art that the examples can be practiced without the specific details. Furthermore, well-known features can be omitted or simplified in order not to obscure the example being described.

Bracketed text and blocks with dashed borders (e.g., large dashes, small dashes, dot-dash, and dots) are used herein to illustrate optional aspects that add additional features to some examples. However, such notation should not be taken to mean that these are the only options or optional operations, and/or that blocks with solid borders are not optional in certain examples.

Reference numerals with suffix letters (e.g., 918A-918N) can be used to indicate that there can be one or multiple instances of the referenced entity in various examples, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters might or might not have the same number of instances in various examples.

References to "one example," "an example," etc., indicate that the example described may include a particular feature, structure, or characteristic, but every example may not necessarily include the particular feature, structure, or characteristic. Moreover, such phrases are not necessarily referring to the same example. Further, when a particular feature, structure, or characteristic is described in connection with an example, it is submitted that it is within the knowledge of one skilled in the art to affect such feature, structure, or characteristic in connection with other examples whether or not explicitly described.

Moreover, in the various examples described above, unless specifically noted otherwise, disjunctive language such as the phrase "at least one of A, B, or C" is intended to be understood to mean either A, B, or C, or any combination thereof (e.g., A, B, and/or C). Similarly, language such as "at least one or more of A, B, and C" (or "one or more of A, B, and C") is intended to be understood to mean A, B, or C, or any combination thereof (e.g., A, B, and/or C). As such, disjunctive language is not intended to, nor should it be understood to, imply that a given example requires at least one of A, at least one of B, and at least one of C to each be present.

As used herein, the term "based on" (or similar) is an open-ended term used to describe one or more factors that affect a determination or other action. It is to be understood that this term does not foreclose additional factors that may affect a determination or action. For example, a determination may be solely based on the factor(s) listed or based on the factor(s) and one or more additional factors. Thus, if an action A is "based on" B, it is to be understood that B is one factor that affects action A, but this does not foreclose the action from also being based on one or multiple other factors, such as factor C. However, in some instances, action A may be based entirely on B.

Unless otherwise explicitly stated, articles such as "a" or "an" should generally be interpreted to include one or multiple described items. Accordingly, phrases such as "a device configured to" or "a computing device" are intended to include one or multiple recited devices. Accordingly, phrases such as "a set of devices configured to" or "a collection of devices configured to" are intended to include one or more recited devices. Such one or more recited devices can be collectively configured to carry out the stated operations. For example, "a processor configured to carry out operations A, B, and C" can include a first processor configured to carry out operation A working in conjunction with a second processor configured to carry out operations B and C, where the second processor could be part of same computing device as the first processor or part of a separate computing device as the first processor.

Further, the words "may" or "can" are used in a permissive sense (i.e., meaning having the potential to), rather than the mandatory sense (i.e., meaning must). The words "include," "including," and "includes" are used to indicate open-ended relationships and therefore mean including, but not limited to. Similarly, the words "have," "having," and "has" also indicate open-ended relationships, and thus mean having, but not limited to. The terms "first," "second," "third," and so forth as used herein are used as labels for the nouns that they precede, and do not imply any type of ordering (e.g., spatial, temporal, logical, etc.) unless such an ordering is otherwise explicitly indicated. Similarly, the values of such numeric labels are generally not used to indicate a required amount of a particular noun in the claims recited herein, and thus a "fifth" element generally does not imply the existence of four other elements unless those elements are explicitly included in the claim or it is otherwise made abundantly clear that they exist.

The specification and drawings are, accordingly, to be regarded in an illustrative rather than a restrictive sense. It will, however, be evident that various modifications and changes can be made thereunto without departing from the broader scope of the disclosure as set forth in the claims.

What is claimed is:

1. A computer-implemented method comprising:
receiving, at an encryption control system of a cloud provider network, a request to create a virtual private cloud (VPC) encryption control in a monitoring mode, wherein the monitoring mode causes the cloud provider network to monitor an encryption state of network traffic associated with the VPC;
monitoring network traffic associated with the VPC for a period of time, resulting in a generation of network flow logs for network flows, each network flow log including an identification of whether network traffic of the corresponding network flow utilizes encryption in transit;
determining, based on an analysis of the network flow logs, that a first network flow is unencrypted;
causing an indication that the first traffic flow is unencrypted to be presented via a graphical user interface (GUI); and
enabling, by the cloud provider network, an encryption enforcement mechanism for the VPC that prevents configuration changes introducing unencrypted network traffic or otherwise enforces an encryption-in-transit requirement for network traffic associated with the VPC.

2. The computer-implemented method of claim 1, further comprising:
receiving, at the encryption control system, a request to enable the encryption enforcement mechanism for the VPC that prevents the VPC from being modified to utilize any further unencrypted network traffic, wherein the request is a modify VPC encryption control message indicating that the VPC encryption control is to be switched to an enforcement mode.

3. The computer-implemented method of claim 2, further comprising:
determining that the first network flow remains unencrypted; and
transmitting a response to the request indicating that the request is denied.

4. A computer-implemented method comprising:
receiving, at a cloud provider network, a request to monitor an encryption state of network traffic associated with a virtual private cloud (VPC) within the cloud provider network;
obtaining network flow logs generated based on observed network activity involving the VPC;
determining, based on the network flow logs, that a first traffic flow is unencrypted; and
causing an indication that the first network flow is unencrypted to be presented; and
enabling, by the cloud provider network, an encryption enforcement mechanism for the VPC that prevents configuration changes introducing unencrypted network traffic or otherwise enforces an encryption-in-transit requirement for network traffic associated with the VPC.

5. The computer-implemented method of claim 4, wherein the request identifies the VPC, wherein one or more computing resources of an application operate within the VPC.

6. The computer-implemented method of claim 5, further comprising:
after receipt of the request to monitor the encryption state, causing encryption state data to be sent, for network flows of the VPC, to a data store as part of the network flow logs.

7. The computer-implemented method of claim 4, wherein causing the indication that the first traffic flow is unencrypted to be presented comprises at least one of:
transmitting a response, including the indication, to a client device responsive to a request to describe an encryption control; or
transmitting data for a graphical user interface (GUI) to the client device, wherein the GUI is to provide the indication based on use of the data.

8. The computer-implemented method of claim 4, further comprising:
receiving, at the cloud provider network, a request to enable the encryption enforcement mechanism for the VPC that prevents the VPC from being modified to utilize any further unencrypted network traffic.

9. The computer-implemented method of claim 8, further comprising:
determining that the first network flow remains unencrypted; and
transmitting a response to the request to enable the encryption enforcement mechanism, the response indicating that the request is denied.

10. The computer-implemented method of claim 8, further comprising:
receiving, at the cloud provider network, a request to create an encryption compliance exception for the first network flow; and
transmitting a response to the request to enable the encryption enforcement mechanism, the response indicating that the encryption enforcement mechanism has been enabled.

11. The computer-implemented method of claim 8, further comprising:

transmitting a response to the request to enable the encryption enforcement mechanism, the response indicating that the encryption enforcement mechanism has been enabled.

12. The computer-implemented method of claim 11, further comprising:

receiving a request to perform an operation within the cloud provider network in association with the VPC, wherein the operation includes one or more of launching a compute instance, attaching a virtual network interface to a compute instance, creating a virtual networking component within the VPC, or connecting the VPC to another VPC or service; and based on the encryption enforcement mechanism being enabled, denying the request to perform the operation.

13. The computer-implemented method of claim 8, wherein:

the request to enable the encryption enforcement mechanism for the VPC comprises a request to modify a VPC encryption control associated with the VPC;

the request to indicates that the VPC encryption control is to be in an enforcement mode; and the request includes an identifier of the VPC.

14. The computer-implemented method of claim 4, further comprising:

after the determining that the first traffic flow is unencrypted, causing traffic of the first traffic flow to be dropped.

15. A system comprising:

a first one or more computing devices to implement a data store in a multi-tenant provider network to store network flow logs; and a second one or more computing devices to implement an encryption control system in the multi-tenant provider network, the encryption control system including instructions that upon execution cause the encryption control system to:

receive a request to monitor an encryption state of network traffic associated with a virtual private cloud (VPC) within the cloud provider network;

obtain network flow logs, from the data store, that were generated based on observed network activity involving the VPC;

determine, based on the network flow logs, that a first traffic flow is unencrypted;

cause an indication that the first network flow is unencrypted to be presented; and enable an encryption enforcement mechanism for the VPC that prevents configuration changes introducing unencrypted network traffic or otherwise enforces an encryption-in-transit requirement for network traffic associated with the VPC.

16. The system of claim 15, wherein the request identifies the VPC, wherein one or more computing resources of an application operate within the VPC.

17. The system of claim 16, wherein the encryption control system further includes instructions that upon execution cause the encryption control system to:

after receipt of the request to monitor the encryption state, cause encryption state data to be sent, for network flows of the VPC, as part of the network flow logs to the data store.

18. The system of claim 15, wherein to cause the indication that the first traffic flow is unencrypted to be presented, the encryption control system is to:

transmit a response, including the indication, to a client device responsive to a request to describe an encryption control; or transmit data for a graphical user interface (GUI) to the client device, wherein the GUI is to provide the indication based on use of the data.

19. The system of claim 15, wherein the encryption control system further includes instructions that upon execution cause the encryption control system to:

receive a request to enable the encryption enforcement mechanism for the VPC that prevents the VPC from being modified to utilize any further unencrypted network traffic.

20. The system of claim 19, wherein the encryption control system further includes instructions that upon execution cause the encryption control system to:

determine that the first network flow remains unencrypted; and transmit a response to the request to enable the encryption enforcement mechanism, the response indicating that the request is denied.

\* \* \* \* \*